Feb. 24, 1931. H. V. TÖRNEBOHM 1,793,763
TOLERANCE GAUGE
Filed March 31, 1928
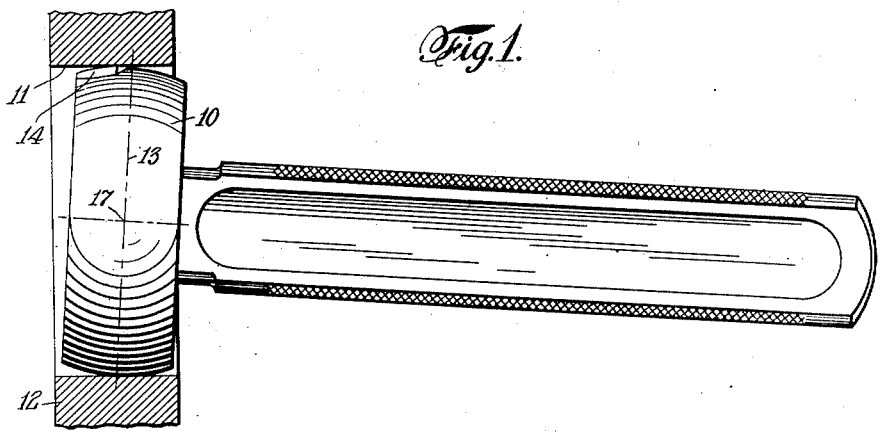
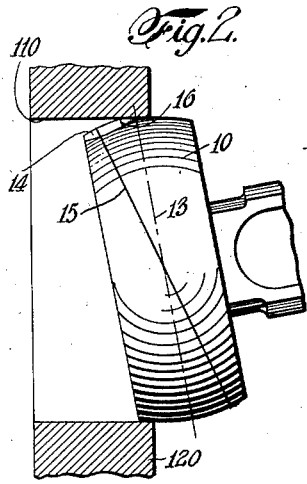 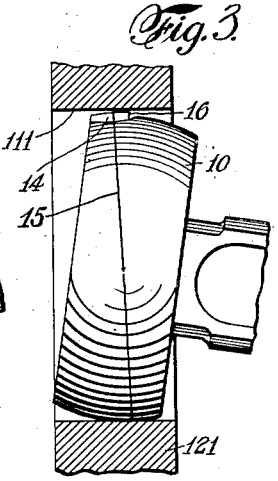 
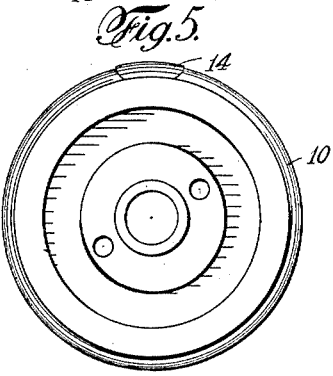
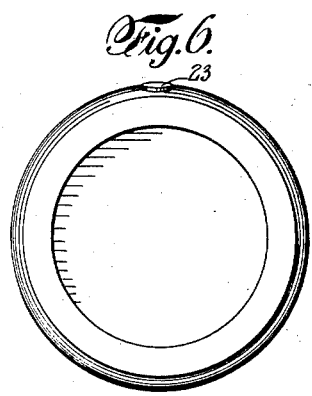 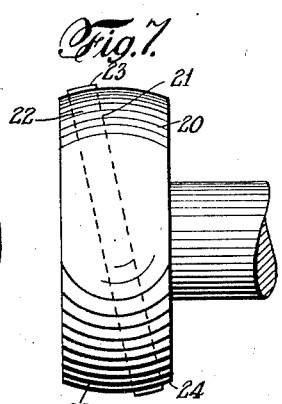
Inventor
Hilding V. Törnebohm
By his Attorney Patented Feb. 24, 1931

1,793,763

UNITED STATES PATENT OFFICE

HILDING VALDEMAR TÖRNEBOHM, OF GOTTENBORG, SWEDEN, ASSIGNOR TO AKTIE-BOLAGET SVENSKA KULLAGERFABRIKEN, OF GOTTENBORG, SWEDEN, A CORPORATION OF SWEDEN

TOLERANCE GAUGE

Application filed March 31, 1928, Serial No. 266,263, and in Sweden July 25, 1927.

For gauging the size of holes determined by tolerances, so-called tolerance gauges are generally used. These gauges have been of various constructions, for instance round plug gauges, flat tolerance gauges or end gauges, provided with two gauging organs, the minimum gauge and the maximum gauge, most generally united by means of a handle or the like. If the hole is to be considered as approved, it must have its dimensions between the values represented by the two gauging organs, one of them—the minimum gauge—must be of such a dimension as to easily enter the hole, whereas the other—the maximum gauge—must not enter the hole. If the first condition, viz. the minimum condition, is not fulfilled, the hole is considered too small, whereas, if the other condition, the maximum condition, is not fulfilled, and the maximum gauge can enter, the hole is considered too large.

The tolerance gauge known as round tolerance gauge is probably the most common. By means of such a tolerance gauge it is, however, only possible to check the magnitude of the inscribed circle of the hole. A possibly existing ovality cannot be ascertained, and thus it is not possible with such a gauge to find out whether the maximum diameter of the hole will be less than the maximum diameter determined for it.

With the other unusual constructions of tolerance gauges, known as flat tolerance gauges or end gauges, it is, on the other hand, possible to check the diameter dimensions existing in the hole. Such gauges, however, cannot be used for checking the inscribed circle of the hole.

Quite recently a new construction of tolerance gauges has come into use. This consists of round minimum gauge and in addition to this a flat gauge or still better an end gauge as maximum gauge. By means of such a tolerance gauge it is possible to check not only whether the inscribed circle of the hole is larger than the determined minimum value, but also whether the maximum diameter of the hole is smaller than the maximum limit value determined. This control can be considered satisfactory as being decisive for the fitting qualities of the hole.

With my present invention handling is essentially facilitated, inasmuch as the checking of the maximum dimension can take place without the necessity of removing the minimum gauge from the hole and thus without turning the tolerance gauge in the hand. This is achieved by giving the gauge a certain irregular shape in such a way that on the gauge the minimum dimension as well as the maximum dimension are represented. With one position of the gauge the minimum condition is checked and with another position of the same gauge the maximum condition is checked. The two positions of the gauge are only so far different from each other that the gauge takes up different angular positions in relation to the center line of the hole.

The drawings accompanying this application illustrate a practicable embodiment of the invention wherein—

Figure 1 shows a side elevation of my improved gauge applied to the bore of a work-piece, the gauge being in the position indicating that the bore of the work-piece is between the prescribed tolerances.

Fig. 2 is a view similar to Figure 1, the handle being shown broken away. In this view the bore of the work-piece is represented as being smaller than the minimum tolerance.

Fig. 3 is a view similar to Fig. 2 indicating that the bore is larger than the maximum tolerance.

Fig. 4 is a view looking at the head of the gauge, so that with the constructions shown in the previous figures this might be called looking downwardly.

Fig. 5 is an end view of the gauge from the left-hand side of Figure 1, and

Figs. 6 and 7 represent a modified form of the device to be described at the proper place.

The head 10 of the gauge is represented as being an equatorial portion of a spherical body having a diameter which is equal to the minimum dimension of the work-piece, i. e. assuming that the bore 11 of the work-piece 12 is to be of a diameter not less than a prescribed measurement, the diameter 13 of the spherical surface of the head 10 is such that the head may enter the bore with a nice working fit. In Fig. 2 the bore 110 of the work-piece 120 is of a diameter smaller than the spherical diameter 13 of the head 10. Consequently, the gauge cannot enter the work-piece.

For gauging the maximum diameter a projection or protuberance is formed on or carried by the head 10. In Figs. 1 to 5 inclusive, this protuberance is in the form of a boss 14 which, in practice, will be a thin metal body of generally circular outline secured to the body of the sphere by some electrolytic process. The diameter 15 taken from the face of the boss 14 to a point directly opposite, represents a value slightly in excess of the maximum dimension, and if when the gauge is inserted in the work-piece it can rock, preferably by means of its handle, so that the boss 14 clears the diameter of the work-piece, in the illustration, the diameter 111 of the work-piece 121 of Fig. 3, the bore is assumed to be too large.

It must be understood that in most tolerance gauging where this improved device will be used, the difference between the minimum and the maximum dimensions is much less than can conveniently be represented in a pen and ink drawing of the character of a Patent Office drawing which has to be made with a view to its permanency and the manner in which reproduction will be made. The principle, however, is the same whether the tolerance is represented as either great or small.

It will be noted in connection with the boss 14 that the side toward the center of the body 10 is formed with a sharp edge 16. This edge may be readily kept in shape and reformed by lapping off the rear face from time to time. This will practically be the only adjustment or attention the gauge will require as long as a sufficient mass of the boss remains, its outer surface being substantially spherical and struck from the center 17 of the body 10.

In using the gauge the operator will seek to enter it into the work-piece as in Fig. 2 in such a position that the boss 14 clears the bore of the work-piece. He then will move the handle in an angular direction, see Fig. 1, generally holding it so that its own weight will cause the spherical body 10 to rock within the bore, which, if such bore 11 comes within the prescribed tolerances, will cause the sharpe edge 16 of the boss 14 to bite into the bore, which will stop the rocking movement. The operator will, in causing the reverse rocking of the spherical body and the movement of the sharp edge away from the bore, feel its release and then the free and easy movement of the spherical body.

When the difference in diameter between the spherical body 10 and the boss 14 is very slight, the spherical body, except for this boss, will have a nice, free, working movement within the bore if this is of the proper size and is round and is cylindrical, so that the operator may readily inspect the work-piece not only to see that it has at least the minimum diameter, but that the bore is round in cross section from end to end, and that it is of approximately the same diameter from end to end. And he may from place to place during this inspection, by merely rocking the gauge, ascertain that the maximum diameter has not been exceeded.

In some instances it may be found preferable to form the boss or the surface for the maximum gauge in an insert. This is illustrated in Fig. 7 in which the spherical head 20 of the gauge is shown provided with an obliquely disposed hole 21 in which is inserted a pin 22 having one or both of its head ends 23, 24 extending beyond the spherical contour 25 of the head of the member 20. This pin or insert will preferably be removable so that it may be repaired or replaced as occasion may require. Another advantage of the ready removability of the boss is the facility with which the sphere may be polished.

It is, of course, obvious that changes may be made within the scope of the claims without departing from the spirit of my invention.

Having described my invention, I claim and desire to secure by Letters Patent:

1. In a tolerance gauge, a body portion comprising the equatorial zone of a sphere, the diameter of a great circle thereof constituting the minimum gauge, and a boss imposed upon such spherical surface and having a spherical outer surface concentric with such body portion, such boss being wholly disposed upon one side of the great circle defining the equator of the spherical body and formed with a sharp edge on its side toward such great circle.

2. A tolerance plug gauge, comprising a body portion having a spherically formed surface the diameter of a great circle of which constitutes the minimum gauge, and a part having a face protruding beyond such spherical surface and constituting in conjunction with the diametrically opposed portion of the spherical surface the maximum gauge, such protruding portion having a spherically formed gauging surface.

3. A tolerance gauge, comprising a body portion in the form of an equatorial zone of a sphere the diameter of a great circle of which constitutes the minimum gauge, and a boss imposed upon the spherical surface thereof and having a spherical outer face concentric with the sphere center of such body portion.

4. In a tolerance gauge, a body portion comprising the equatorial zone of a sphere, the diameter of a great circle thereof constituting the minimum gauge, and a boss imposed upon such spherical surface and having a spherical outer surface concentric with such body portion, such boss being wholly disposed upon one side of the great circle defining the equator of the spherical body.

5. A tolerance plug gauge comprising a handle, a body portion having a spherically formed surface the diameter of a great circle of which constitutes the minimum gauge and a part having a face protruding beyond such spherical surface and constituting in conjunction with the diametrically opposed portion of the spherical surface the maximum gauge, such protruding portion being so positioned that it may be brought into engagement with the bore of the work by turning the gauge about an axis perpendicular to the axis of the handle.

Signed at New York, N. Y. this 30th day of March 1928.

H. V. TÖRNEBOHM.